(12) United States Patent
Terazawa et al.

(10) Patent No.: US 11,438,355 B2
(45) Date of Patent: Sep. 6, 2022

(54) IN-VEHICLE NETWORK ANOMALY DETECTION SYSTEM AND IN-VEHICLE NETWORK ANOMALY DETECTION METHOD

(71) Applicant: Panasonic Intellectual Property Corporation of America, Torrance, CA (US)

(72) Inventors: Hiroyasu Terazawa, Osaka (JP); Tomoyuki Haga, Nara (JP); Yuishi Torisaki, Osaka (JP); Ryo Kato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 406 days.

(21) Appl. No.: 16/818,364

(22) Filed: Mar. 13, 2020

(65) Prior Publication Data

US 2020/0220888 A1  Jul. 9, 2020

Related U.S. Application Data

(63) Continuation of application No. PCT/JP2018/045619, filed on Dec. 12, 2018.

(30) Foreign Application Priority Data

Dec. 15, 2017  (JP) .............................. JP2017-240759

(51) Int. Cl.
*H04L 29/06* (2006.01)
*H04L 12/40* (2006.01)
(Continued)

(52) U.S. Cl.
CPC ........ *H04L 63/1425* (2013.01); *B60L 3/0023* (2013.01); *B60R 16/023* (2013.01);
(Continued)

(58) Field of Classification Search
CPC ................. H04L 63/1425; H04L 67/12; H04L 2012/40273; B60L 3/0023; B60R 16/023; B60T 17/221; B62D 5/0481
(Continued)

(56) References Cited

U.S. PATENT DOCUMENTS 9,827,992 B2 * 11/2017 Prakah-Asante ..... B60W 40/09
10,158,658 B1 * 12/2018 Sharifi Mehr ...... H04L 63/1425
(Continued)

FOREIGN PATENT DOCUMENTS

| JP | 2013-187555 | 9/2013 | |
| JP | 2015012478 A * | 1/2015 | ............. H02H 3/006 |

(Continued)

OTHER PUBLICATIONS

Adrian et al., "Anomaly Detection in Automobile Control Network Data with Long Short-Term Memory Networks," 2016, Publisher: IEEE.*

(Continued)

*Primary Examiner* — Tuan C To
(74) *Attorney, Agent, or Firm* — Wenderoth, Lind & Ponack, L.L.P.

(57) ABSTRACT

An anomaly detection system is on an in-vehicle network including: a first network connected to first devices that communicate using a first protocol; and a second network connected to second devices that includes a driving assistance controller communicates using a second protocol. The system includes: a communicator receiving, through the first network, first unit data including (i) source information indicating a source first device and (ii) second unit data including a data identifier; a database storing rule; and an anomaly determiner that determines whether the first unit data has anomaly by comparing the source information and the data identifier with the rule. Based on the rule, the first
(Continued)

unit data is determined to have anomaly when the source first device is a sensing device and, according to the identifier, the second unit data is to be received by the controller.

9 Claims, 8 Drawing Sheets

(51) Int. Cl.
| | | |
|---|---|---|
| H04L 29/08 | (2006.01) | |
| B60R 16/023 | (2006.01) | |
| B62D 5/04 | (2006.01) | |
| B60T 17/22 | (2006.01) | |
| B60L 3/00 | (2019.01) | |
| H04L 9/40 | (2022.01) | |
| H04L 67/12 | (2022.01) | |

(52) U.S. Cl.
CPC .......... *B60T 17/221* (2013.01); *B62D 5/0481* (2013.01); *H04L 12/40* (2013.01); *H04L 67/12* (2013.01); *H04L 2012/40215* (2013.01); *H04L 2012/40273* (2013.01)

(58) Field of Classification Search
USPC .......................................................... 714/48
See application file for complete search history.

(56) References Cited

U.S. PATENT DOCUMENTS

| 10,545,024 | B1 * | 1/2020 | Konrardy | .............. B60W 10/20 |
| 10,693,668 | B2 * | 6/2020 | Park | ........................ H04L 12/18 |
| 2014/0023068 | A1 * | 1/2014 | Kim | .................. H04L 12/40006 |
| | | | | 370/355 |
| 2015/0172298 | A1 | 6/2015 | Otsuka | |
| 2015/0358351 | A1 | 12/2015 | Otsuka et al. | |
| 2016/0261482 | A1 * | 9/2016 | Mixer | ...................... H04L 43/12 |
| 2017/0013005 | A1 * | 1/2017 | Galula | ................ H04L 63/1425 |
| 2017/0352201 | A1 * | 12/2017 | Kumabe | ............... G07C 5/008 |
| 2018/0314571 | A1 | 11/2018 | Tanabe et al. | |
| 2019/0036952 | A1 * | 1/2019 | Sim | ........................ G06N 20/00 |
| 2019/0056231 | A1 * | 2/2019 | Bai | ......................... G01S 19/45 |
| 2019/0058613 | A1 | 2/2019 | Maeda et al. | |
| 2019/0082016 | A1 | 3/2019 | Sasaki et al. | |
| 2019/0149565 | A1 * | 5/2019 | Hagi | ..................... G06N 5/022 |
| | | | | 726/23 |

FOREIGN PATENT DOCUMENTS

| JP | 2015-114907 | | 6/2015 | |
| JP | 2015189270 A | * | 11/2015 | .......... B60R 25/102 |
| JP | 2016-111477 | | 6/2016 | |
| JP | 2017-112590 | | 6/2017 | |
| JP | 2017-212726 | | 11/2017 | |
| WO | 2014/115455 | | 7/2014 | |
| WO | WO-2017021970 A1 | * | 2/2017 | ......... G05B 19/0423 |
| WO | 2017/203906 | | 11/2017 | |

OTHER PUBLICATIONS

Jinrui et al., "Bus Communication and Control Protocol Using the Electric Passenger Car Control System," 2006, vol. 2, Publisher: IEEE.*
International Search Report dated Feb. 26, 2019 in International (PCT) Application No. PCT/JP2018/045619.
Written Opinion of International Searching Authority dated Feb. 26, 2019 with English language summary of Written Opinion and reply (in English and Japanese) thereto.

* cited by examiner

FIG. 6

| ECU TYPE | CAN ID | CAN DATA FIELD | |
|---|---|---|---|
| | | SETTABLE VALUE | MEANING OF SET VALUE |
| MIRROR ECU | 10 | 1000, 1001 | 1000: STORED, 1001: EXTENDED |
| WINDOW ECU | 20 | 2000-2010 | 2000: FULLY CLOSED, 2001-2009: STEPWISELY OPENED, 2010: FULLY OPENED |
| BRAKE ECU | 30 | 3000, 3001 | 3000: ON, 3001: OFF |
| ACCELERATOR ECU | 40 | 4000-4200 | 4000: 0 km/h, ..., 4200: 200 km/h |
| STEERING ECU | 50 | 5000-5600 | 5000: FULLY TURNED TO LEFT, ..., 5300: CENTER, ..., 5600: FULLY TURNED TO RIGHT |

FIG. 7

| INFORMATION SYSTEM/DRIVING-ASSISTANCE SYSTEM DEVICES | | CAN ID OF CONTROL SYSTEMS ECU TO BE CONTROLLED |
|---|---|---|
| DEVICE(S) NAME | IP ADDRESS | |
| IVI | 192.168.0.2 | 10, 20 |
| ADAS | 192.168.0.3 | 30, 40, 50 |
| LIDAR | 192.168.0.4 | NONE |
| CAMERA | 192.168.0.5 | NONE |
| DYNAMIC MAP | 192.168.0.6 | NONE |

FIG. 8

| PROCESSING No. | ANOMALY PROCESSING |
|---|---|
| 1 | NOTIFY RESULT TRANSMITTER OF DETECTION OF ANOMALY |
| 2 | DISCARD RECEIVED Ethernet PACKET |
| 3 | BLOCK COMMUNICATIONS FROM SOURCE ECU |
| 4 | NOTIFY RESULT TRANSMITTER OF INSTRUCTION FOR EXITING AUTOMATIC DRIVING MODE AND SWITCHING TO MANUAL DRIVING MODE |

FIG. 9

| | | CAN ID DESIGNATED BY SOURCE DEVICE | | | | |
|---|---|---|---|---|---|---|
| | | 10 (MIRROR ECU) | 20 (WINDOW ECU) | 30 (BRAKE ECU) | 40 (ACCELERATOR ECU) | 50 (STEERING ECU) |
| SOURCE DEVICES | IVI | NORMAL PROCESSING | NORMAL PROCESSING | ANOMALY PROCESSING (PROCESSING Nos.: 1, 2, 3) | ANOMALY PROCESSING (PROCESSING Nos.: 1, 2, 3, 4) | ANOMALY PROCESSING (PROCESSING Nos.: 1, 2, 3, 4) |
| | ADAS | ANOMALY PROCESSING (PROCESSING Nos.: 1, 2) | ANOMALY PROCESSING (PROCESSING Nos.: 1, 2) | NORMAL PROCESSING | NORMAL PROCESSING | NORMAL PROCESSING |
| | LIDAR | ANOMALY PROCESSING (PROCESSING Nos.: 1, 2) | ANOMALY PROCESSING (PROCESSING Nos.: 1, 2) | ANOMALY PROCESSING (PROCESSING Nos.: 1, 2, 3) | ANOMALY PROCESSING (PROCESSING Nos.: 1, 2, 3, 4) | ANOMALY PROCESSING (PROCESSING Nos.: 1, 2, 3, 4) |
| | CAMERA | ANOMALY PROCESSING (PROCESSING Nos.: 1, 2) | ANOMALY PROCESSING (PROCESSING Nos.: 1, 2) | ANOMALY PROCESSING (PROCESSING Nos.: 1, 2, 3) | ANOMALY PROCESSING (PROCESSING Nos.: 1, 2, 3, 4) | ANOMALY PROCESSING (PROCESSING Nos.: 1, 2, 3, 4) |
| | DYNAMIC MAP | ANOMALY PROCESSING (PROCESSING Nos.: 1, 2) | ANOMALY PROCESSING (PROCESSING Nos.: 1, 2) | ANOMALY PROCESSING (PROCESSING Nos.: 1, 2, 3) | ANOMALY PROCESSING (PROCESSING Nos.: 1, 2, 3, 4) | ANOMALY PROCESSING (PROCESSING Nos.: 1, 2, 3, 4) |

FIG. 10

| CAN ID FOR DATA FIELD DETERMINED AS HAVING ANOMALY | IMPORTANCE | ANOMALY PROCESSING (PROCESSING No.) |
|---|---|---|
| 10 (MIRROR) | LOW | 1, 2 |
| 20 (WINDOW) | LOW | 1, 2 |
| 30 (BRAKE) | MEDIUM | 1, 2, 3 |
| 40 (ACCELERATOR) | HIGH | 1, 2, 3, 4 |
| 50 (STEERING) | HIGH | 1, 2, 3, 4 |

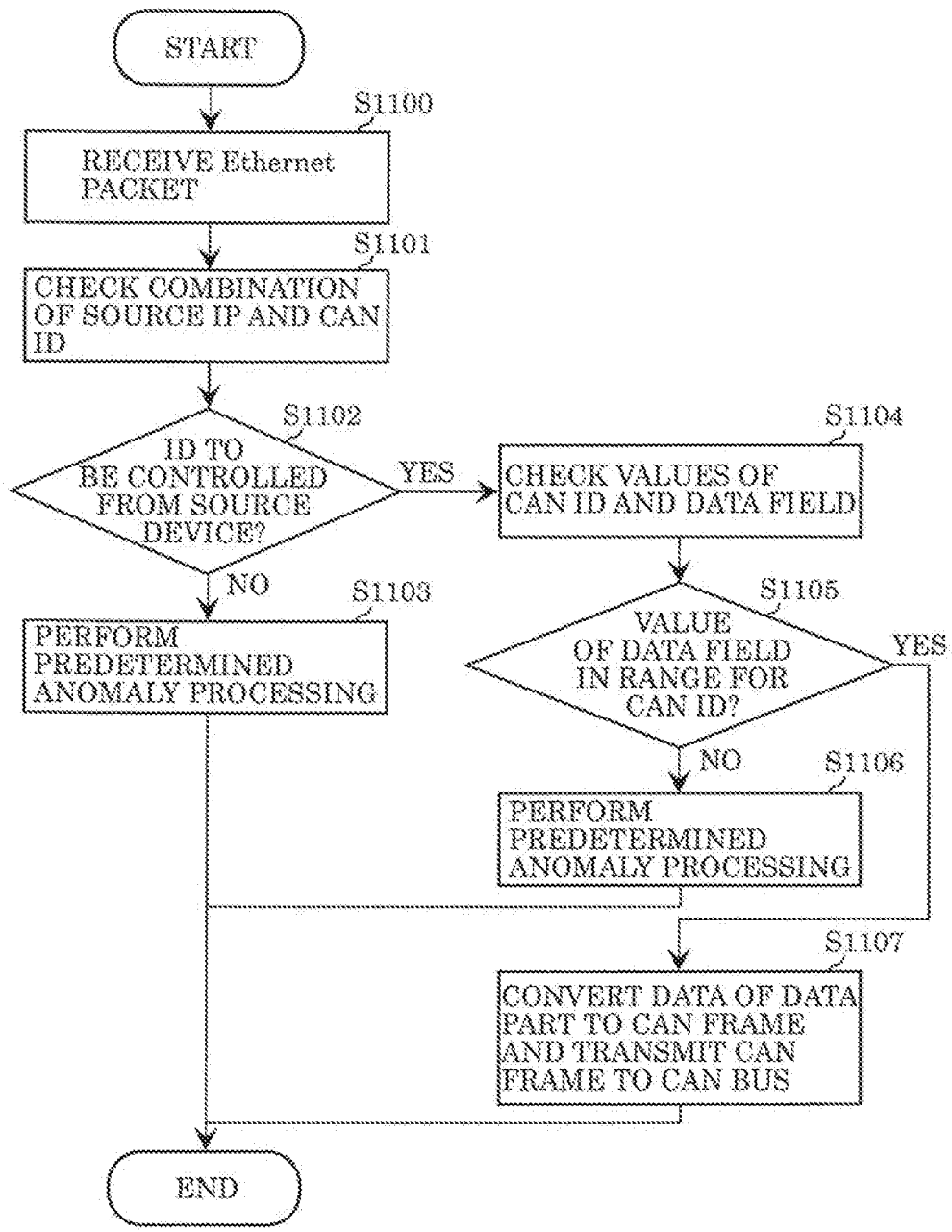

IN-VEHICLE NETWORK ANOMALY DETECTION SYSTEM AND IN-VEHICLE NETWORK ANOMALY DETECTION METHOD

CROSS REFERENCE TO RELATED APPLICATIONS

This application is a U.S. continuation application of PCT International Patent Application Number PCT/JP2018/045619 filed on Dec. 12, 2018, claiming the benefit of priority of Japanese Patent Application Number 2017-240759 filed on Dec. 15, 2017, the entire contents of which are hereby incorporated by reference.

BACKGROUND

1. Technical Field

The present disclosure relates to detection of an anomaly of an unauthorized message from among messages used on an in-vehicle network.

2. Description of the Related Art

In recent years, a system included in an automobile has a large number of devices called electronic control units (hereinafter, referred to as ECUs). Such a network connecting the ECUs is called an in-vehicle network. Among many standards established for in-vehicle networks, Controller Area Network (hereinafter, referred to as CAN (registered trademark)) with a maximum communication speed of about 1 Mbps is generally used.

In the future, automobiles will be advance to achieve fully automated driving through improvement in driving assistance. Under the circumstances, the number of ECUs installed in each vehicle is expected to increase. A communication data amount on an in-vehicle network increases with the number of ECUs and thus results in a restriction at the communication speed of CAN. Hence, as one of techniques for speeding up in-vehicle networks, Ethernet (registered trademark) that is well-proved in general information networks such as the Internet is expected to be applied to in-vehicle networks. Ethernet enables communications at 100 Mbps, which is 100 times faster than the communication speed of CAN. In view of the extensibility and flexibility of a bandwidth, Ethernet is expected to replace CAN as a technique applied to in-vehicle networks.

However, automobiles in which Ethernet is used as an on-vehicle network are still under development. It is currently difficult to fully make a transition from CAN to Ethernet in view of safety and introduction cost.

Thus, it is expected that a transition from CAN to Ethernet will be gradually made, that is, CAN networks and Ethernet networks will be first mixed in the in-vehicle network of a vehicle and then the CAN networks will be completely replaced with Ethernet networks. In advanced driving assistance and fully automated driving that is an advanced model of driving assistance, quite a large amount of data is processed on an in-vehicle network. Such a large amount of data including sensor data and video data requires parallel processing. Thus, in in-vehicle networks, it is expected that CAN is first replaced with Ethernet in parts connected to in-vehicle devices categorized as an information system that requires processing of an enormous amount of information typified by sensing information from sensors such as a camera and a LIDAR or dynamic map information, a safety system, driving assistance (hereinafter, including automated driving) system, and then CAN is replaced with Ethernet in parts connected to devices categorized as a control system for running and driving of vehicles. The control system is regarded as a principal system in a vehicle in view of safety and reliability.

In such an environment including both CAN network and Ethernet network, a gateway is necessary for passing messages among the plurality of networks having different protocols.

For example, Japanese Patent Laid-Open No. 2016-111477 (hereinafter, referred to as PTL 1) discloses a gateway for performing protocol conversion and passing messages between a CAN protocol and another protocol in communications according to the protocol other than the CAN protocol.

Moreover, to achieve fully automated driving, it is necessary to use cloud service information such that an automobile acquires latest map information or information changing in real time around the automobile. Thus, connection with an external network is indispensable. This presents security threats such as an unauthorized access from an external network, requiring security measures.

For example, WO 2014/115455 (hereinafter, referred to as PTL 2) discloses a method of detecting an attack of an unauthorized message and defending an in-vehicle network against the attack. The unauthorized message enters the in-vehicle network and causes a malfunction. On an in-vehicle network where only CAN is used, a mainly used message is transmitted at a period that is set for each kind of included data. In view of this point, a message transmitted at a period different from the set period is determined as being unauthorized, thereby detecting the unauthorized message and preventing unauthorized data transfer.

SUMMARY

However, in order to protect an in-vehicle network from threat of cyber attacks, the above-described anomaly detection in the in-vehicle network of a vehicle for more advanced driving assistance requires more reliable detection of an anomaly than in the techniques disclosed in PTL 1 or 2.

The present disclosure provides, for example, an in-vehicle network anomaly detection system that more reliably detects an anomaly and protects the in-vehicle network from threat of cyber attacks.

According to an aspect of the present disclosure, there is provided the in-vehicle network anomaly detection system that determines whether or not data communicated through an in-vehicle network in a vehicle has an anomaly, the system being on the in-vehicle network including a first network connecting a plurality of first devices that perform communications using a first protocol and a second network connecting a plurality of second devices that perform communications using a second protocol different from the first protocol, the system comprising: a first communicator that receives first unit data from the plurality of first devices through the first network, the first unit data being data that is transferred in units specified in the first protocol; an anomaly determination database that stores an anomaly determination rule based on which a determination as to whether or not the first unit data has an anomaly is made; an anomaly determiner that makes the determination whether or not the first unit data has an anomaly based on the anomaly determination rule; a unit data converter that extracts second unit data from the first unit data when the anomaly determiner determines that the first unit data does not have an anomaly, the second unit data being data that is transferred in units specified in the second protocol and being included in a data field of the first unit data; and a second communicator that transmits the extracted second unit data to the second network, wherein the first unit data includes source information indicating a first device that is a source of the first unit data from among the plurality of first devices, the second unit data included in the first unit data includes a data identifier of the second unit data, the anomaly determiner performs the determination by comparing (i) a combination of (i-1) the source information and (i-2) the data identifier with (ii) the anomaly determination rule, and when determining that the first unit data has an anomaly, performs predetermined anomaly processing, the plurality of first devices include: a third device that transmits the second unit data included in the first unit data, the second unit data indicating a command for driving assistance for the vehicle under control of at least one of the plurality of second devices, the driving assistance being based on at least one of a route, a condition, and a status of the vehicle; and a sensing device of the vehicle, the plurality of second devices include a controller that performs control for driving assistance on the vehicle in accordance with the command received from one of the plurality of first devices via the second communicator, and the anomaly determination rule includes a rule based on which the anomaly determiner determines that: a combination of (i-1) the source information indicating the sensing device and (i-2) the data identifier included in the second unit data received by the controller has an anomaly; and a combination of (i-1) the source information indicating the third device and (i-2) the data identifier included in the second unit data received by the controller is normal.

According to another aspect of the present disclosure, there is provided an in-vehicle network anomaly detection method performed in an in-vehicle network anomaly detection system that determines whether or not data communicated through an in-vehicle network in a vehicle has an anomaly, the system being on the in-vehicle network including a first network connecting a plurality of first devices that perform communications using a first protocol and a second network connecting a plurality of second devices that perform communications using a second protocol different from the first protocol, the method comprising: receiving first unit data from the plurality of first devices through the first network, the first unit data being data that is transferred in units specified in the first protocol; determining whether or not the first unit data has an anomaly based on an anomaly determination rule; extracting second unit data from the first unit data when the determination is made that the first unit data does not have any anomaly, the second unit data being data that is transferred in units specified in the second protocol and being included in a data field of the first unit data; and transmitting the extracted second unit data to the second network, wherein the first unit data includes source information indicating a corresponding first device serving as a source of the first unit data from among the plurality of first devices, the second unit data included in the first unit data includes a data identifier of the second unit data, the determining whether or not the first unit data has an anomaly includes comparing (i) a combination of (i-1) the source information and (i-2) the data identifier with (ii) the anomaly determination rule, the plurality of first devices include: a third device that transmits the second unit data included in the first unit data, the second unit data indicating a command for driving assistance for the vehicle under control of at least one of the plurality of second devices, the driving assistance being based on at least one of a route, a condition, and a status of the vehicle; and a sensing device of the vehicle, the plurality of second devices include a controller that performs control for driving assistance on the vehicle in accordance with the command, the command being received from one of the plurality of first devices, the command being included in the first unit data, the command being indicated in the second unit data that is extracted from the second unit data and transmitted to the second network data, and the anomaly determination rule includes a rule based on which the determining is made that: a combination of (i-1) the source information indicating the sensing device and (i-2) the data identifier included in the second unit data received by the controller has an anomaly; and a combination of (i-1) the source information indicating the third device and (i-2) the data identifier included in the second unit data received by the controller is normal.

General or specific aspects of the present disclosure may be implemented to an integrated circuit, a computer program, or a computer-readable recording medium such as a Compact Disc-Read Only Memory (CD-ROM), or implemented to any given combination of a system, a method, an integrated circuit, a computer program, and a recording medium.

The in-vehicle network anomaly detection system and the in-vehicle network anomaly detection method of the present disclosure can more reliably detect an anomaly and protect the in-vehicle network from threat of cyber attacks.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 illustrates an example of a list of the CAN IDs for the CAN frames received by ECUs and values that can be set in a data field according to the embodiment.

FIG. 7 illustrates an example of a white list of the CAN frames received by a control system ECU that receives commands from an information system and a driving assistance system according to the embodiment.

FIG. 8 illustrates an example of a list of anomaly processing performed by an anomaly determiner according to the embodiment.

FIG. 9 illustrates an example of a processing list if the anomaly determiner according to the embodiment determines the occurrence of an anomaly based on a combination of a source device and the value of the CAN ID.

FIG. 10 illustrates a processing list if the anomaly determiner according to the embodiment determines the occurrence of an anomaly based on the value of a data field associated with the CAN ID.

FIG. 11 is a processing flowchart of the Ethernet-CAN gateway according to the embodiment.

Figure 1:
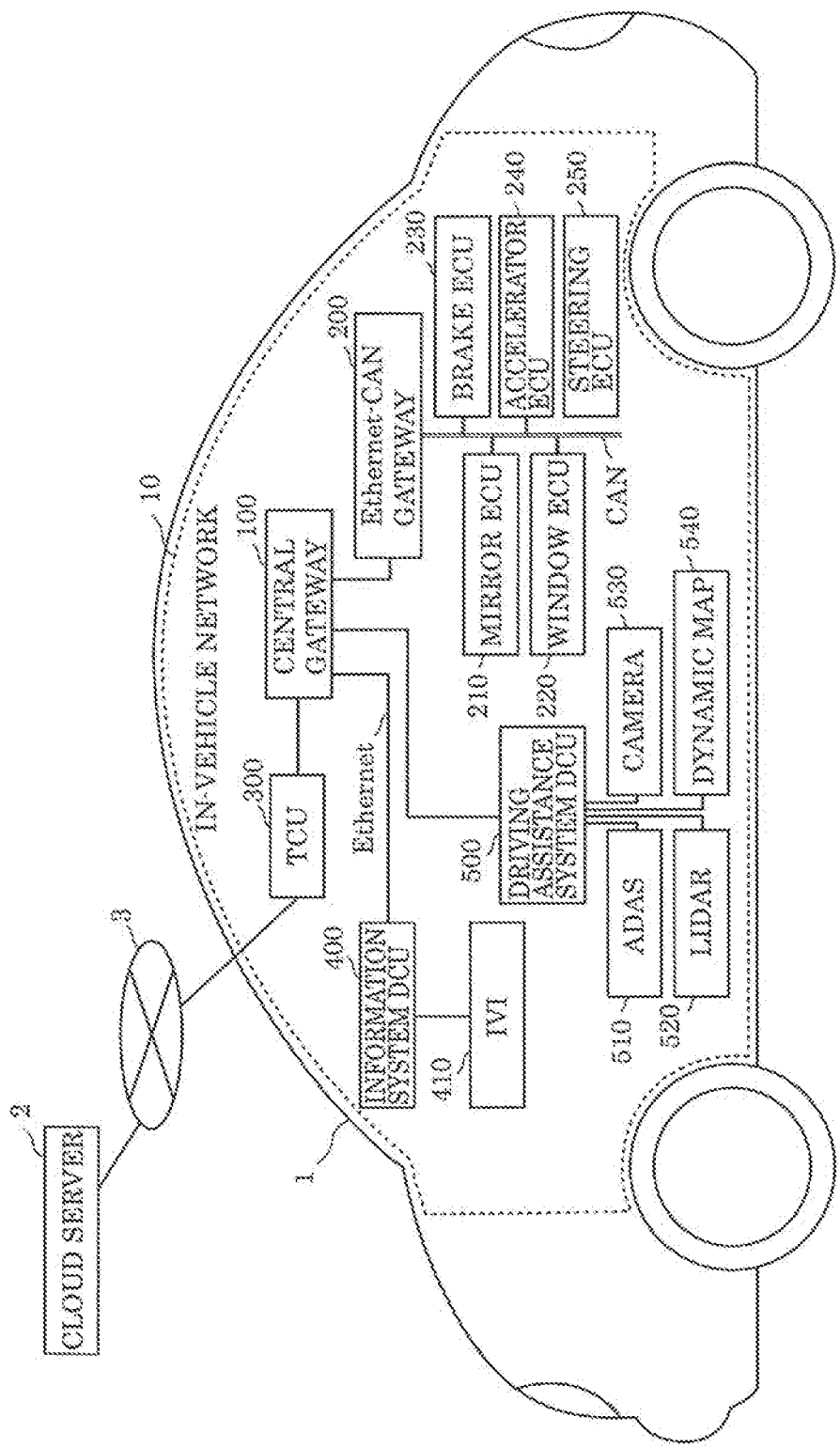
FIG. 1 is a block diagram of an overall in-vehicle network according to an embodiment.

DETAILED DESCRIPTION OF THE EMBODIMENT (Observation Forming Basis of the Present Disclosure)

The inventors discovered the following problems related to the technique of in-vehicle network anomaly detection described in "BACKGROUND ART."

In the technique disclosed in PTL 1, at least one of the voltage of a communication bus connected to a device and the communication period of the device is monitored in a gateway for passing messages between networks where different protocols are used. If an anomaly is detected as a result of monitoring, the authorization of the device is determined.

In order to detect and protect from an attack of unauthorized data that may enter a network and cause a malfunction, PTL 2 discloses a technique of detecting unauthorized data and preventing unauthorized data transfer based on the period information of the network.

Such networks are intended to mainly represent an in-vehicle network where a single protocol is used. In the in-vehicle network, a message is transmitted at a set period. Therefore, if a message is received at a period different from the set period, the message is determined as being unauthorized, and a protecting operation is performed against the attack in order, for example, to detect the unauthorized message and prevent unauthorized data transfer.

In this technique, however, even if an anomaly is detected on the in-vehicle network based on a communication period, the source of the unauthorized message cannot be blocked and consecutive anomalies may occur. For example, if the calculation resource of a device included in the in-vehicle network is pressed for processing the data including the anomalies, a large amount of data necessary for driving assistance may not be processed in time. Such a situation is a serious problem in the safety of a vehicle.

In order to solve the above problem, according to an aspect of the present disclosure, there is provided the in-vehicle network anomaly detection system that determines whether or not data communicated through an in-vehicle network in a vehicle has an anomaly, the system being on the in-vehicle network including a first network connecting a plurality of first devices that perform communications using a first protocol and a second network connecting a plurality of second devices that perform communications using a second protocol different from the first protocol, the system comprising: a first communicator that receives first unit data from the plurality of first devices through the first network, the first unit data being data that is transferred in units specified in the first protocol; an anomaly determination database that stores an anomaly determination rule based on which a determination as to whether or not the first unit data has an anomaly is made; an anomaly determiner that makes the determination whether or not the first unit data has an anomaly based on the anomaly determination rule; a unit data converter that extracts second unit data from the first unit data when the anomaly determiner determines that the first unit data does not have an anomaly, the second unit data being data that is transferred in units specified in the second protocol and being included in a data field of the first unit data; and a second communicator that transmits the extracted second unit data to the second network, wherein the first unit data includes source information indicating a first device that is a source of the first unit data from among the plurality of first devices, the second unit data included in the first unit data includes a data identifier of the second unit data, and the anomaly determiner performs the determination by comparing (i) a combination of (i-1) the source information and (i-2) the data identifier with (ii) the anomaly determination rule, and when determining that the first unit data has an anomaly, performs predetermined anomaly processing.

This can more reliably detect an anomaly on an in-vehicle network.

For example, it is possible that the in-vehicle network anomaly detection system, wherein the plurality of first devices include a device that transmits the second unit data included in the first unit data, the second unit data indicating a command for driving assistance on the vehicle under control of at least one of the plurality of second devices, the driving assistance being based on at least one of a route, a condition, and a status of the vehicle, and the anomaly determination rule indicates one or more data identifiers for each of the plurality of first devices, the one or more data identifiers each being the data identifier included in the second unit data that indicates the command and is included in the first unit data and transmitted by the device according to specification.

For example, it is possible that he plurality of second devices include a controller that performs control for driving assistance on the vehicle in accordance with a command received from one of the plurality of first devices via the second communicator, that the plurality of first devices include a sensing device of the vehicle, and that the anomaly determination rule includes a rule based on which the anomaly determiner determines that a combination of (i-1) the source information indicating the sensing device and (i-2) the data identifier included in the second unit data received by the controller has an anomaly.

This reduces communications between devices that do not communicate with each other on the specifications. Hence, an anomaly can be more reliably detected on the in-vehicle network.

For example, it is possible that the plurality of second devices include a controller that performs control for driving assistance on the vehicle in accordance with a command received from one of the plurality of first devices via the second communicator, that the second unit data included in the first unit data further includes a parameter for the control for driving assistance, and that the anomaly determination rule further indicates, for each of the plurality of second devices, a combination of (i-21) the data identifier included in the second unit data received according to specification and (i-22) a value of the parameter.

This can more reliably detect an anomaly on the in-vehicle network.

For example, it is possible that the command relates to one of acceleration, braking, and steering of the vehicle, and that the parameter relates to one of acceleration, braking, and steering of the vehicle.

This can prevent the influence of an attack on control system devices in the vehicle so as not to cause a more serious accident.

For example, it is possible that the anomaly determination rule indicates a normal combination of the source information and the data identifier, the normal combination being normal according to specification, and that the anomaly determiner determines that the first unit data does not have any anomaly when the combination matches the normal combination indicated by the anomaly determination rule.

Thus, transmitted data is not transferred between devices that do not communicate with each other on the specifications. This can increase safety against a cyber attack on the in-vehicle network without sacrificing functions provided by information processing on the vehicle.

For example, it is possible that as the predetermined anomaly processing, the anomaly determiner discards the first unit data determined as having an anomaly. For example, it is possible that as the predetermined anomaly processing, the anomaly determiner identifies, based on the source information, the source of the first unit data determined as having an anomaly from among the plurality of first devices, and lowers a level of driving assistance on the vehicle.

This can prevent the influence of an anomaly on the in-vehicle network. In particular, the lowering of the level of driving assistance can prevent the influence of an attack on the control system. Moreover, a driver can quickly drive for evacuation, thereby lowering the risk of traffic accidents.

For example, it is possible that as the predetermined anomaly processing, the anomaly determiner identifies, based on the source information, the source of the first unit data determined as having an anomaly from among the plurality of first devices, and blocks communications from the identified first device on the in-vehicle network.

This can remove the cause of the anomaly from the in-vehicle network, thereby continuing safe driving.

For example, it is possible that the anomaly determiner outputs a result of the determination as the predetermined anomaly processing, and that the system further comprises a result transmitter that notifies a user of the vehicle of the anomaly by transmitting the result to an information provider in the vehicle to provide the user with information. For example, it is possible that the anomaly determiner outputs a result of the determination as the predetermined anomaly processing, and the system further includes a result transmitter that transmits the result to a communication network outside the vehicle. Thus, information on the occurrence of the anomaly on the in-vehicle network can be used by a user, e.g., a vehicle driver. Alternatively, the information may be used by another vehicle running near the vehicle where the anomaly has occurred, an Intelligent Transport Systems (ITS) spot, or a Security Operation Center (SOC). Thus, a countermeasure for a cyber attack can be optionally provided around the site of the anomaly. Furthermore, the information may be used by vehicle manufacturers or vehicle part manufacturers and applied to the improvement or development of products so as to prevent the same kind of attack.

Furthermore, according to another aspect of the present disclosure, there is provided that An in-vehicle network anomaly detection method performed in an in-vehicle network anomaly detection system that determines whether or not data communicated through an in-vehicle network in a vehicle has an anomaly, the system being on the in-vehicle network including a first network connecting a plurality of first devices that perform communications using a first protocol and a second network connecting a plurality of second devices that perform communications using a second protocol different from the first protocol, the method including: receiving first unit data from the plurality of first devices through the first network, the first unit data being data that is transferred in units specified in the first protocol; determining whether or not the first unit data has an anomaly based on an anomaly determination rule; extracting second unit data from the first unit data when the determination is made that the first unit data does not have any anomaly, the second unit data being data that is transferred in units specified in the second protocol and being included in a data field of the first unit data; and transmitting the extracted second unit data to the second network, wherein the first unit data includes source information indicating a corresponding first device serving as a source of the first unit data from among the plurality of first devices, the second unit data included in the first unit data includes a data identifier of the second unit data, the determining whether or not the first unit data has an anomaly includes comparing (i) a combination of (i-1) the source information and (i-2) the data identifier with (ii) the anomaly determination rule, the plurality of first devices include: a third device that transmits the second unit data included in the first unit data, the second unit data indicating a command for driving assistance for the vehicle under control of at least one of the plurality of second devices, the driving assistance being based on at least one of a route, a condition, and a status of the vehicle; and a sensing device of the vehicle, the plurality of second devices include a controller that performs control for driving assistance on the vehicle in accordance with the command, the command being received from one of the plurality of first devices, the command being included in the first unit data, the command being indicated in the second unit data that is extracted from the second unit data and transmitted to the second network data, and the anomaly determination rule includes a rule based on which the determining is made that: a combination of (i-1) the source information indicating the sensing device and (i-2) the data identifier included in the second unit data received by the controller has an anomaly; and a combination of (i-1) the source information indicating the third device and (i-2) the data identifier included in the second unit data received by the controller is normal.

General or specific aspects of the present disclosure may be implemented to an integrated circuit, a computer program, or a computer-readable recording medium such as a Compact Disc-Read Only Memory (CD-ROM), or implemented to any given combination of a system, a method, an integrated circuit, a computer program, and a recording medium.

Hereinafter, exemplary embodiments will be described in detail with reference to the Drawings. The following embodiments are general or specific examples of the present disclosure. The numerical values, shapes, materials, elements, arrangement, connection, and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment

[System Configuration]

FIG. 1 is an overall block diagram of an in-vehicle network according to an embodiment. In-vehicle network 10 installed in vehicle 1 includes a network that is constructed according to an Ethernet protocol and is illustrated by a single solid line and a network that is in compliance with a CAN protocol and is illustrated by a double solid line. In the present embodiment, the Ethernet protocol is an example of a first protocol and the CAN protocol is an example of a second protocol.

Central gateway 100 included in in-vehicle network 10 is connected to Ethernet-CAN gateway 200, telematics control unit (hereinafter, will be referred to as a TCU) 300, information system Domain Control Unit (DCU) 400, and driving assistance system DCU 500 via Ethernet communication lines.

TCU 300 included in in-vehicle network 10 is a unit for communications of vehicle 1 with cloud server 2 via external network 3. In the present embodiment, for example, TCU 300 is a device for radio communications via, for example, a mobile phone network or Wi-Fi (registered trademark).

Information system DCU 400 included in in-vehicle network 10 is connected to In-Vehicle Infotainment (IVI) 410, which is an information system device or a system, via an Ethernet communication line and performs domain management on an information system network that provides a driver and other passengers (hereinafter, will be referred to as users) with information by using video and sound. The IVI includes, for example, a car navigation system and hardware and software that provide the function of playing back video and music and the function of presenting information on a state around vehicle 1 or a status of vehicle 1 to users of vehicle 1 including a driver.

Driving assistance system DCU 500 included in in-vehicle network 10 is connected to Advanced Driver-Assistance System (ADAS) 510, Laser Imaging Detection and Ranging (LIDAR) 520, camera 530, and DYNAMIC MAP 540 via Ethernet communication lines.

ADAS 510 is a system that assists driving operations by making determinations related to the execution of lane keeping, automatic parking, or the avoidance of other transport means or obstacles based on states inside and outside running vehicle 1.

LIDAR 520 includes a photosensor for detecting an obstacle outside the vehicle and camera 530 includes a photosensor for detecting light to capture an image of a state outside the vehicle. The photosensors are examples of a sensing device of the present embodiment.

DYNAMIC MAP 540 receives and controls a dynamic map.

Hereinafter, a combination or any one of information system DCU 400 and the IVI may be referred to as an information system device. Hereinafter, a combination or any one of driving assistance system DCU 500 and ADAS 510, LIDAR 520, camera 530, and DYNAMIC MAP 540 that are connected to driving assistance system DCU 500 may be referred to as a driving-assistance system device. From these devices, data indicating commands for controlling vehicle 1 can be contained in an Ethernet packet and transmitted to assist driving based on the route of vehicle 1 or the conditions or statuses of vehicle 1.

Ethernet-CAN gateway 200 included in in-vehicle network 10 relays the Ethernet network and the CAN network in in-vehicle network 10. Mirror ECU 210, window ECU 220, brake ECU 230, accelerator ECU 240, and steering ECU 250 are connected to Ethernet-CAN gateway 200 via a CAN bus.

Mirror ECU 210 controls the operations of folding and unfolding the electric remote-controlled outside mirrors of vehicle L Window ECU 220 controls the operations of opening and closing the windows of vehicle 1. Brake ECU 230 controls the operations of the main brake of vehicle 1. Accelerator ECU 240 controls operations for accelerating vehicle 1. Steering ECU 250 controls operations for steering vehicle 1. Mirror ECU 210, window ECU 220, brake ECU 230, accelerator ECU 240, and steering ECU 250 are examples of a controller according to the present embodiment. Hereinafter, the ECUs will be also referred to as control system ECUs.

Central gateway 100, TCU 300, information system DCU 400, driving assistance system DCU 500, and the devices connected thereto are examples of a first device according to the present embodiment. The first device performs communications using the Ethernet protocol. The first device directly or indirectly communicates also with Ethernet-CAN gateway 200 by using the Ethernet protocol. Hereinafter, the network to which the first devices are connected will be also referred to as a first network.

Mirror ECU 210, window ECU 220, brake ECU 230, accelerator ECU 240, and steering ECU 250 that are connected to Ethernet-CAN gateway 200 and perform communications using the CAN protocol are examples of a second device according to the present embodiment. Hereinafter, the network to which the second devices are connected will be also referred to as a second network.

Figure 2:
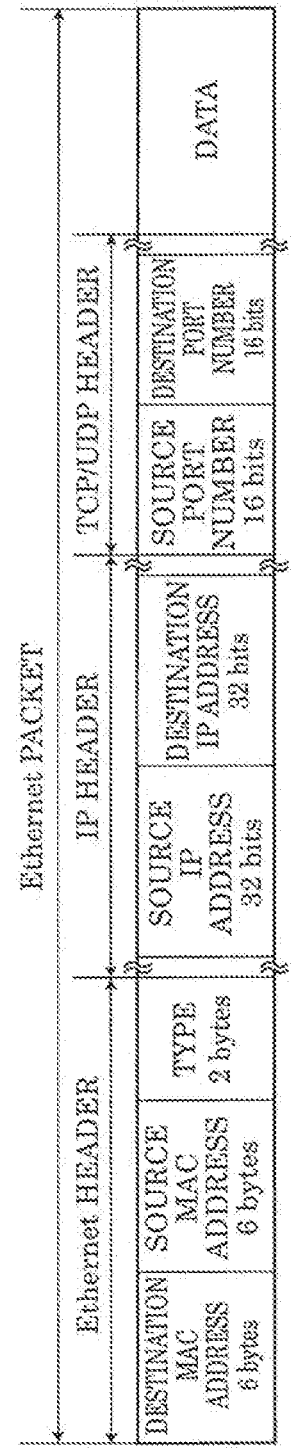
FIG. 2 indicates the format of an Ethernet packet according to the embodiment.

FIG. 2 illustrates the data format of an Ethernet packet transmitted and received in the first network. The Ethernet packet sequentially includes an Ethernet header, an IP header, a TCP header or a UDP header, and data from the head. The Ethernet header includes a destination MAC address, a source MAC address, and a type. The IP header includes a source IP address and a destination address. The TCP header and the UDP header each include a source port number and a destination port number. The above-mentioned parts relate to proper transmission and reception between a device that transmits the Ethernet packet and a device that receives the Ethernet packet. The subsequent field of data (hereinafter, will be referred to as the data field (of the Ethernet packet)) includes, for example, sensing information that is outputted from the sensors and indicates sensing results or data indicating commands or the like from a transmitting device to a receiving device. The Ethernet packet is the data of a unit of communications for transmission and reception between the first devices and an example of first unit data according to the present embodiment.

Figure 3:
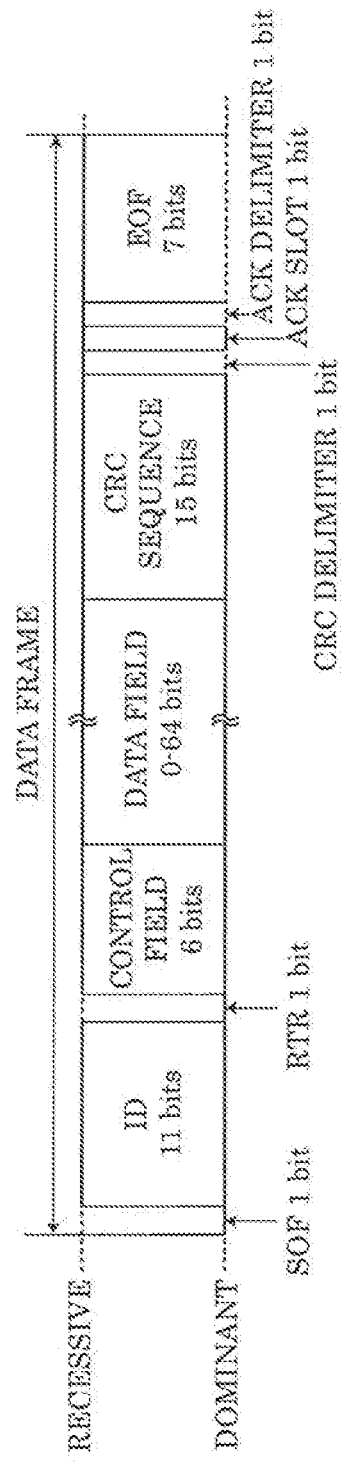
FIG. 3 indicates the format of a CAN frame according to the embodiment.

FIG. 3 illustrates the format of CAN frame transmitted and received in the second network. The CAN frame includes two formats: a standard format and an extended format. The technique of the present embodiment can be used in the standard format and the extended format. The standard format will be described below as an example.

The CAN frame of the standard format includes, from the head, the slots of an Start of Frame (SOF), an ID, an Remote Transmission Request (RTR), a control field, a data field, a Cyclic Redundancy Check (CRC) sequence and a CRC delimiter, an ACKnowledgement (ACK) slot and an ACK delimiter, and an End of Frame (EOF). FIG. 3 also illustrates the length of each slot (bit length). The upper and lower solid lines indicate possible states (recessive/dominant) of the CAN bus in each slot. Data corresponding to the contents of the data field in the Ethernet packet is included in the data field of the CAN frame. The kinds of contents are indicated by the slot values of the ID. The CAN frame is the data of a unit of communications for transmission and reception between the second devices and an example of second unit data according to the present embodiment. The ID is the identifier of the second unit data with respect to the data type of the data field and is an example of the data identifier according to the present embodiment.

Figure 4:
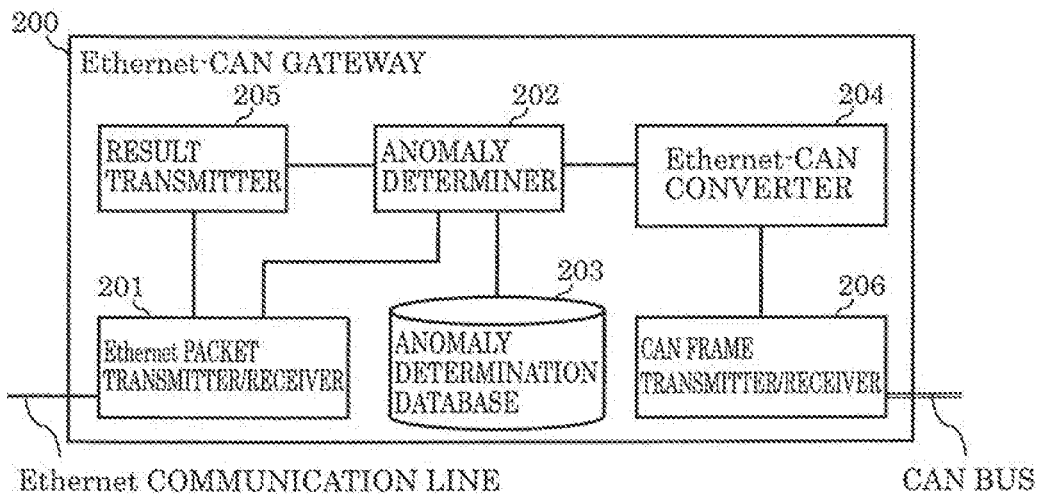
FIG. 4 is a block diagram of an Ethernet-CAN gateway according to the embodiment.

FIG. 4 is a block diagram of Ethernet-CAN gateway 200. Ethernet-CAN gateway 200 includes Ethernet packet transmitter/receiver 201, anomaly determiner 202, anomaly determination database 203, Ethernet-CAN converter 204, result transmitter 205, and CAN frame transmitter/receiver 206.

Ethernet-CAN gateway 200 extracts the CAN frame packed in the Ethernet packet received by Ethernet packet transmitter/receiver 201 and transmits the CAN frame from CAN frame transmitter/receiver 206 to the CAN bus, so that data is transferred from the Ethernet network to the CAN network. Moreover, the CAN frame received by CAN frame transmitter/receiver 206 is packed in the Ethernet packet and is transmitted from Ethernet packet transmitter/receiver 201 to the Ethernet communication line, so that data is transferred from the CAN network to the Ethernet network.

Figure 5:
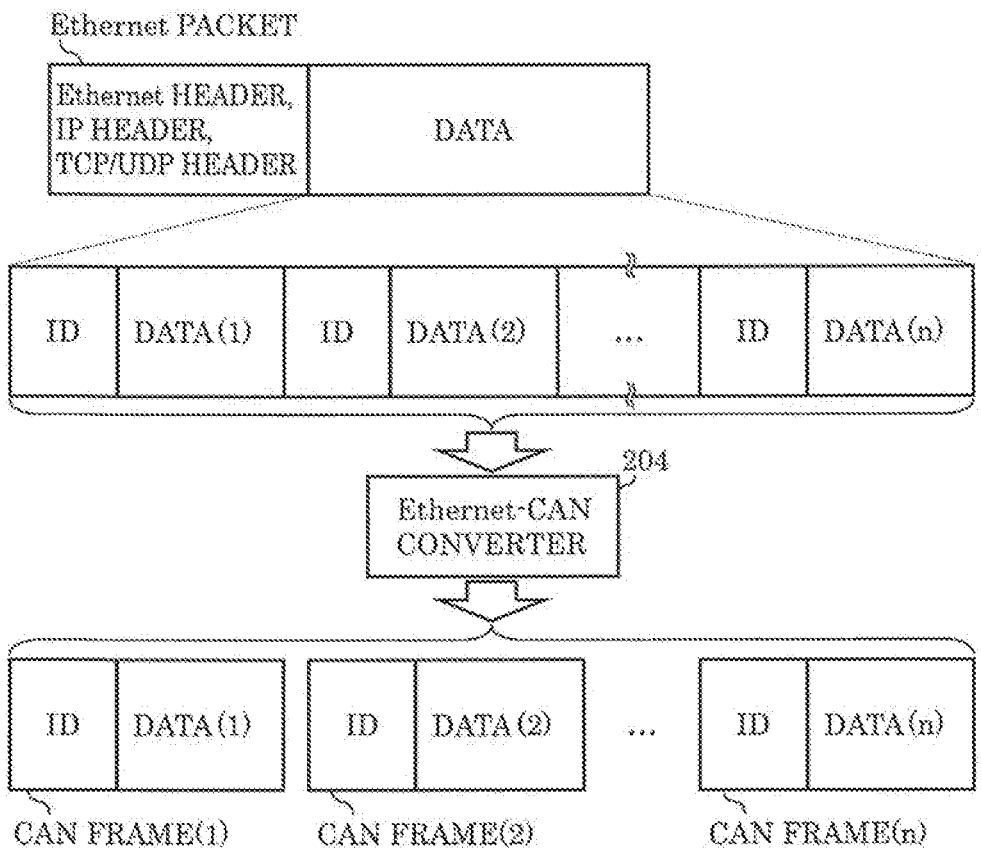
FIG. 5 illustrates the outline of processing performed by an Ethernet-CAN converter according to the embodiment.

FIG. 5 illustrates the outline of processing in which Ethernet-CAN converter 204 extracts a plurality of CAN frames from an Ethernet packet and transmits the extracted CAN frames in Ethernet-CAN gateway 200.

As described above, in Ethernet-CAN gateway 200, Ethernet packet transmitter/receiver 201 receives the Ethernet packet transmitted from one of an information system device and a driving-assistance system device that are connected to the Ethernet network. The information system device or the driving-assistance system device transmits the Ethernet packet (first unit data) containing the CAN frames (second unit data) in the data field of the Ethernet packet. In the example of FIG. 5, n CAN frames are contained in the data field of the Ethernet packet. Some of the CAN frames include, in the data field, commands for the devices connected to the CAN network. The n CAN frames connected in the data field of the Ethernet packet received by Ethernet packet transmitter/receiver 201 are extracted. The connected and extracted n CAN frames are separately transmitted to the CAN bus by CAN frame transmitter/receiver 206. In the series of processing, Ethernet-CAN converter 204 extracts the CAN frames from the data field of the Ethernet packet.

Anomaly determination database 203 indicates a rule (hereinafter, may be referred to as an anomaly determination rule) for determining whether data transmitted and received in in-vehicle network 10 is unauthorized data or not, that is, whether anomalous data is contained or not.

Anomaly determiner 202 and result transmitter 205 will be described later.

FIG. 6 illustrates an example of a list of the CAN IDs for the CAN frames received on the specifications by the control system ECUs connected to the CAN bus; and values (parameter values) that can be set in the data field of the received CAN frame on the specifications. The specifications are determined in consideration of the operations of the overall CAN network by, for example, a designer of vehicle 1 or in-vehicle network 10. The list is contained in anomaly determination database 203 and includes part of basic information of the anomaly determination rule.

In this example, mirror ECU 210 receives the CAN frame having a CAN ID of 10. In the data field of the CAN frame having a CAN ID of 10, parameter values that can be set on the specifications are 1000 and 1001. The value of 1000 means the storage of the mirror while the value of 1001 means the extension of the mirror.

Window ECU 220 receives the CAN frame having a CAN ID of 20. In the data field of the CAN frame having a CAN ID of 20, parameter values that can be set on the specifications are 2000 to 2010. The value of 2000 means full closing of a window, the values of 2001 to 2009 mean step-by-step opening of the window (a degree of opening of the window), and the value of 2010 means full opening of the window.

Brake ECU 230 receives the CAN frame having a CAN ID of 30. In the data field of the CAN frame having a CAN ID of 30, parameter values that can be contained on the specifications are 3000 and 3001. The value of 3000 means the turn-on of brake control while the value of 3001 means the turn-off of the brake control.

Accelerator ECU 240 receives the CAN frame having a CAN ID of 40. In the data field of the CAN frame having a CAN ID of 30, parameter values that can be set on the specifications are 4000 to 4200. The values indicate vehicle speeds. For example, the value of 4000 means 0 km/h and the value of 4200 means 200 km/h.

Steering ECU 250 receives the CAN frame having a CAN ID of 50. In the data field of the CAN frame having a CAN ID of 50, parameter values that can be contained on the specifications are 5000 to 5600. The values indicate the turning angle of steering. For example, 5000 means a maximum angle to the left, 5300 means the center (a turning angle of 0), and 5600 means a maximum angle to the right.

FIG. 7 illustrates an example of a combination list of: the IP addresses of the information system devices or driving-assistance system devices that are connected to the Ethernet network; and the CAN IDs for the CAN frames received by the control system ECU that receives commands transmitted for control from the devices on the specifications. In other words, the list is an example of a white list of authorized data indicating commands transmitted to the control system device from the information system device or the driving-assistance system device in in-vehicle network 10. The list is also contained in anomaly determination database 203 and includes part of basic information of the anomaly determination rule.

According to the list, for example, IVI 410 has an IP address of 192.168.0.2. Moreover, the CAN IDs for the CAN frames transmitted for control from IVI 410 are 10 and 20 on the specifications. Specifically, referring to the table of FIG. 6, the control system ECUs that receive commands transmitted from IVI 410 on the specifications are mirror ECU 210 and window ECU 220. In this case, IVI 410 does not transmit commands to other ECUs (specifically, brake ECU 230, accelerator ECU 240, steering ECU 250) on the specifications. In other words, according to the specifications of in-vehicle network 10, the devices to receive commands for control from IVI 410 are limited to mirror ECU 210 and window ECU 220.

ADAS 510 has an IP address of 192.168.0.3. Moreover, the CAN IDs for the CAN frames transmitted for control from ADAS 510 are 30, 40, and 50 on the specifications. Specifically, referring to the table of FIG. 6, the control system ECUs that receive commands transmitted from ADAS 510 on the specifications are brake ECU 230, accelerator ECU 240, and steering ECU 250. In this case, ADAS 510 does not transmit commands to other ECUs (specifically, mirror ECU 210 and window ECU 220) on the specifications.

LIDAR 520 has an IP address of 192.168.0.4, camera 530 has an IP address of 192.168.0.5, and DYNAMIC MAP 540 has an IP address of 192.168.0.6. The devices of the driving assistance system do not directly transmit commands for control to any one of the control system ECUs on the specifications. Specifically, a sensing device, e.g., a LIDAR or a camera transmits data on sensing results to in-vehicle network 10 but does not make any determination or transmit commands to the control system device based on the determination on the specifications.

Anomaly determiner 202 determines whether the Ethernet packet received by Ethernet packet transmitter/receiver 201 includes an anomaly or not based on the anomaly determination rule. FIG. 8 illustrates an example of processing (hereinafter, will be also referred to as anomaly processing) performed in Ethernet-CAN gateway 200 when anomaly determiner 202 determines that the Ethernet packet includes an anomaly based on the anomaly determination rule contained in anomaly determination database 203. Processing No. 1 is processing for notifying result transmitter 205 that the Ethernet packet includes an anomaly, that is, the occurrence of an anomaly. Processing No. 2 is processing for discarding the Ethernet packet when it is determined that the Ethernet packet includes an anomaly. Processing No. 3 is processing for blocking communications from an information system device or a driving-assistance system device as the source device. Processing No. 4 is processing for exiting an automatic driving mode and notifying the result transmitter of an instruction for switching to a manual driving mode.

FIG. 9 illustrates an example of a processing list in a case where anomaly determiner 202 determines that there is an anomaly related to the value of the CAN ID specified by the information system or the driving-assistance system device as the source, that is, the value of the CAN ID in the CAN frame included in the data field of the Ethernet packet.

For example, if the source device is IVI 410, the control system ECUs that receive control commands are mirror ECU 210 and window ECU 220 according to the white list of FIG. 7. Thus, if the CAN ID for the CAN frame included in the Ethernet packet transmitted from IVI 410 is 10 or 20, anomaly determiner 202 determines that the CAN ID is normal and performs predetermined processing for normal conditions, for example, anomaly determiner 202 transmits the extracted CAN frame to the CAN network. IVI 410 never transmits commands to brake ECU 230, accelerator ECU 240, or steering ECU 250 on the specifications. Thus, if the CAN ID for the CAN frame included in the data field of the Ethernet packet is 30, 40, or 50, anomaly determiner 202 determines that the Ethernet packet is data including an anomaly and performs anomaly processing according to the processing IDs of FIG. 8. For example, if the CAN ID for the CAN packet included in the Ethernet packet transmitted from IVI 410 is "30" that is the CAN ID for the CAN frame which only brake ECU 230 receives on the specifications, anomaly determiner 202 performs the anomaly processing including: notifying the result transmitter of the determination result (processing No. 1); discarding the Ethernet packet (processing No. 2); and identifying the source device of the Ethernet packet with reference to the source information (e.g., an IP address) included in the Ethernet packet, and thereby blocking the communications form the identified source device (processing No. 3). For example, if "40" that is the CAN ID for the CAN packet which only accelerator ECU 240 receives is designated, the anomaly processing includes: notifying the result transmitter of the determination result (processing No. 1); discarding the Ethernet packet (processing No. 2); identifying the source device by the source information included in the Ethernet packet and blocking the communications from the identified source device (processing No. 3); and exiting the automatic driving mode and notifying the result transmitter of a command for switching to the manual driving mode (processing No. 4). Also in the case where the source device is ADAS 510, LIDAR 520, camera 530, or DYNAMIC MAP 540, the normal processing or the anomaly processing is performed according to the determination result of whether or not the Ethernet packet has an anomaly as indicated by the table of FIG. 9. The table is also contained in anomaly determination database 203 and includes part of information of the anomaly determination rule.

FIG. 10 illustrates an example of a processing list if anomaly determiner 202 determines that an anomaly occurs on the value of the data field corresponding to the CAN ID based on the anomaly determination rule indicated by information contained in anomaly determination database 203. For the sequence of n CAN frames included in the received Ethernet packet or randomly selected some of the n CAN frames, anomaly determiner 202 determines whether or not the value of a parameter included in the data field has an anomaly.

If the CAN ID is 10 (the CAN frame received by mirror ECU 210) or 20 (the CAN frame received by window ECU 220), anomaly determiner 202 determines that an anomaly is present when the set value of the data field is different from the values indicated in the list of FIG. 6. The determination result is then transmitted to the result transmitter (processing No. 1) and the Ethernet packet is discarded (processing No. 2). However, it is determined that even if a malfunction occurs due to anomalous data, mirror ECU 210 and window ECU 220 are unlikely to cause a serious accident. Thus, the importance of mirror ECU 210 and window ECU 220 is determined as a low level.

If the CAN ID is 30 (the CAN frame received by brake ECU 230), anomaly determiner 202 determines that an anomaly is present when the set value of the data field is different from the values indicated in the list of FIG. 6. Thus, the anomaly processing is performed such that the determination result is transmitted to the result transmitter (processing No. 1) and the Ethernet packet is discarded (processing No. 2). In addition to the processing, anomaly determiner 202 performs the anomaly processing including: identifying the source device by the source information included in the Ethernet packet; and blocking the communications from the identified source device (processing No. 3). However, if brake ECU 230 malfunctions due to anomalous data, there is a risk of disturbing the driving assistance and damaging the safety of driving. Thus, the importance of the brake ECU is determined as a middle level.

If the CAN ID is 40 (the CAN frame received by accelerator ECU 240) or 50 (the CAN frame received by steering ECU 250), anomaly determiner 202 determines that an anomaly is present when the set value of the data field is different from the values indicated in the list of FIG. 6. Thus the anomaly processing includes: transmitting the determination result to the result transmitter (processing No. 1); discarding the Ethernet packet (processing No. 2); identifying the source device by the source information included in the Ethernet packet and blocking the communications from the identified source device (processing No. 3). In addition to the processing, anomaly determiner 202 exits the automatic driving mode and notifies the result transmitter of a command for switching to the manual driving mode (processing No. 4). In the event of unauthorized control, accelerator ECU 240 and steering ECU 250 are likely to cause a serious accident. Thus, the importance of accelerator ECU 240 and steering ECU 250 is determined as a high level.

The processing list in FIG. 10 is used in this way. The list is also contained in anomaly determination database 203 and includes part of the basic information of the anomaly determination rule.

The steps of processing performed using information contained in anomaly determination database 203 by Ethernet-CAN gateway 200 will be described below in accordance with a specific example.

[Steps of Determining an Anomaly to Processing on the Anomaly]

FIG. 11 is a flowchart of a process example in which Ethernet-CAN gateway 200 of the present embodiment receives the Ethernet packet, whether or not the Ethernet packet has an anomaly is determined, and processing is performed according to the determination result.

(S1100) Ethernet packet transmitter/receiver 201 receives the Ethernet packet transmitted from the information system device or the driving-assistance system device to the Ethernet network.

(S1101) Anomaly determiner 202 checks a combination of the source information included in the Ethernet packet and the CAN ID for each CAN frame included in the data field of the Ethernet packet.

(S1102) In this check, anomaly determiner 202 compares the combination of the source information and the CAN ID with information included in the white list of FIG. 7 and checks, on the specifications, whether the CAN ID included in the data field is the CAN ID for the CAN frame received by the device to be controlled from among source devices indicated by the source information.

(S1103) As a result of S1102, if the source device corresponds to the CAN ID received by the control system ECU that does not provide an instruction of control on the specifications, that is, if the combination of the source information and the CAN ID is not present in the white list of FIG. 7, it is determined that the Ethernet packet includes an anomaly and the anomaly processing in FIG. 8 is performed according to the processing list of FIG. 9.

(S1104) As a result of S1102, if it is determined that the combination is normal, anomaly determiner 202 checks a combination of the CAN ID and the data field value of each CAN frame included in the Ethernet packet. The data field value is, for example, the value of a parameter for control by the control system ECU to receive the CAN frame.

(S1105) In this check, anomaly determiner 202 compares the combination of the CAN ID and the parameter value with a combination of the CAN ID included in the list of FIG. 6 and a settable value and checks whether the data field has a value at or in the range of the settable value with respect to the CAN ID.

(S1106) As a result of S1105, if the value of the data field included in the CAN frame is not the settable value with respect to the CAN ID, it is determined that the Ethernet packet including the CAN frame has an anomaly and the anomaly processing in FIG. 8 is performed according to the processing list of FIG. 10.

(S1107) As a result of S1105, if it is determined that the combination is normal, Ethernet-CAN converter 204 extracts the CAN frame from the Ethernet packet. The extracted CAN frame is transmitted to the CAN bus from CAN frame transmitter/receiver 206.

The Effects of the Embodiment

In the foregoing embodiment, in the in-vehicle network including CAN networks and Ethernet networks, an unauthorized message is detected using the characteristics of both protocols in the Ethernet-CAN gateway. The present configuration can prevent a serious accident by detecting a cyber attack. In a cyber attack, for example, an attacker takes over a system or devices such as an ECU connected to an Ethernet network and rewrites the contents of a message used on an in-vehicle network, leading to an unauthorized operation of a control system ECU. Moreover, it is possible that the source device is identified and the communications from the identified source device are blocked, thereby preventing threat to the security of the in-vehicle network and a heavy load kept for an extended period. The Ethernet-CAN gateway configured thus is an example of the in-vehicle network anomaly detection system according to the embodiment.

Other Modifications

Although only some exemplary embodiment of the present disclosure have been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure. The in-vehicle network anomaly detection system was described according to at least one aspect. The present disclosure is not limited to the embodiment. Without departing from the scope of the present disclosure, various modifications may be made for the present embodiment by a person skilled in the art or the constituent elements of the embodiment and various modifications may be combined within the scope of at least one aspect. The modifications of the embodiment will be described below.

(1) In the embodiment, the anomaly determiner is configured in the Ethernet-CAN gateway, which is an aspect of the in-vehicle network anomaly detection system according to the present disclosure. The location of the anomaly determiner is not limited to the Ethernet-CAN gateway. The anomaly determiner may be configured in any apparatus for passing data on an in-vehicle network, for example, in an Ethernet Switch, a central gateway, and the DCU of each domain.

(2) In the embodiment, a white list system is used for the anomaly determination database. A blacklist system that determines an anomaly if there is a match in the list of the anomaly determination database may be used instead. Alternatively, the databases of the white list system and the blacklist system may be used.

(3) In the embodiment, the occurrence of an anomaly is determined if there is no match according to the anomaly determination rule based on information included in the anomaly determination database. The determination is not limited. If there is no match, for example, the determination result may be stored as a log. Furthermore, if there is no match, a notification of the anomaly determination result to the result transmitter may not be provided. Moreover, the anomaly determination database may include the items of enabled actions such that the actions can be switched for each entry included in the anomaly determination database. For example, an anomaly may be determined or undetermined or processing other than anomaly determination may be performed in the actions. For example, for a specific entry, a determination result may be usually stored as a log after the determination of the anomaly determiner. Alternatively, for example, the anomaly determiner may transmit a determination result to the result transmitter, the result transmitter may forward the determination result to the TCU, and the determination result may be usually transmitted from the TCU to a cloud server.

(4) In the embodiment, exiting the automatic driving mode and switching to the manual driving mode in the anomaly processing are illustrated as examples of the functions of driving assistance. The anomaly processing is not limited to these functions. The level of driving assistance in a vehicle may be lowered (the level of manual driving may be lowered) as the anomaly processing. The function of driving assistance may be partially disabled. For example, the function of avoiding rear-end collision and the function of lane keeping assistance may be maintained, whereas a function capable of acceleration control, e.g., the function of lane changing assistance may be stopped. As another example, a vehicle may be forcibly decelerated by automatic driving and then may be stopped in a safe location.

(5) The embodiment does not specifically describe a technique of blocking the communications from the source device of the Ethernet packet including an anomaly. The technique is not particularly limited. The transmission/reception function of the source device may be merely disabled or the source device may be shut down. Alternatively, if the source device belongs to any domain, data received from the source device may be totally discarded by the DCU of the domain in order to prevent the leakage of data to other parts in the in-vehicle network.

(6) The determination result may be notified to a user as the anomaly processing. For example, the anomaly determiner outputs the determination result and notifies the result transmitter of the determination result. When the result transmitter transmits the notified determination result to the IVI, the determination result may be notified to the user through the WI. The IVI is a vehicle information provider in this example. As another example, the determination result may be notified to the user through an instrument panel. The determination result may include information on the source device of anomalous data, an affected receiving device, or a system including these devices as well as whether or not the data has an anomaly. If the function of driving assistance is limited as described above, information on the limited function or the like may be also notified to the user.

(7) The determination result transmitted from the result transmitter through the TCU may be transmitted to another adjacent vehicle by Vehicle-to-Everything (V2X) or to a traffic infrastructure, e.g., a traffic light or a road sign by Vehicle-to-Infrastructure (V2I).

(8) In the embodiment, information included in the anomaly determination database is used to identify the control system ECU instructed by the devices of the information system and the driving control system to perform control on the specifications. The information is not limited. The control system ECU may be determined from normal operations during the network communications of the functions based on, for example, the specifications of the functions. The control system ECU may be identified according to user settings as well as predetermined specifications.

(9) Data including various lists contained in the anomaly determination database according to the embodiment is merely exemplary and thus is not limited. For example, a data type in the anomaly determination database may be a stream ID included in an IEEE 1722 frame in Ethernet AVB or the unique value of the device connected to the in-vehicle network.

(10) In the embodiment, driving assistance system DCU 500 not directly connected to the CAN bus may be directly connected to the CAN bus. In this case, the Ethernet-CAN gateway may be included in the driving assistance system DCU and the driving assistance system DCU may convert the Ethernet packet and the CAN frame and determine an anomaly of the Ethernet packet. Moreover, the CAN frame of a command to the control system ECU may be directly transmitted from the driving assistance system DCU to the CAN bus, the CAN frame being included in the Ethernet packet determined as being normal.

(11) In the embodiment, the network environment including Ethernet networks and CAN networks was described as an example. The embodiment is not limited to the network environment. For example, the technique of the present disclosure is also applicable to a network where the protocol of Media Oriented Systems Transport (MOST) or FlexRay is used instead of Ethernet. Moreover, the technique of the present disclosure is applicable to a network where the CAN network is replaced with Local Interconnect Network (LIN).

(12) Specifically, the devices of the embodiment are embodied as a computer system including a microprocessor and a storage device, e.g., ROM, RAM, or a hard disk unit. A computer program is recorded in the storage device. The microprocessor operates according to the computer program, thereby achieving the function of the respective device. In order to achieve the function, the computer program includes a combination of command codes indicating commands to a computer.

INDUSTRIAL APPLICABILITY

The in-vehicle network anomaly detection system according to the present disclosure is disposed on an in-vehicle network. This protects the in-vehicle network from cyber attacks such as unauthorized access with higher reliability and contributes to the development of vehicles with higher safety.

What is claimed is:
1. An in-vehicle network anomaly detection system that determines whether or not data communicated through an in-vehicle network in a vehicle has an anomaly, the system being on the in-vehicle network including a first network connecting a plurality of first devices that perform communications using a first protocol and a second network connecting a plurality of second devices that perform communications using a second protocol different from the first protocol,
the system comprising:
a first communicator that receives first unit data from the plurality of first devices through the first network, the first unit data being data that is transferred in units specified in the first protocol;
an anomaly determination database that stores an anomaly determination rule based on which a determination as to whether or not the first unit data has an anomaly is made;
an anomaly determiner that makes the determination whether or not the first unit data has an anomaly based on the anomaly determination rule;
a unit data converter that extracts second unit data from the first unit data when the anomaly determiner determines that the first unit data does not have an anomaly, the second unit data being data that is transferred in units specified in the second protocol and being included in a data field of the first unit data; and
a second communicator that transmits the extracted second unit data to the second network,
wherein the first unit data includes source information indicating a first device that is a source of the first unit data from among the plurality of first devices,
the second unit data included in the first unit data includes a data identifier of the second unit data
the anomaly determiner performs the determination by comparing (i) a combination of (i-1) the source information and (i-2) the data identifier with (ii) the anomaly determination rule, and when determining that the first unit data has an anomaly, performs predetermined anomaly processing, the plurality of first devices include:
a third device that transmits the second unit data included in the first unit data, the second unit data indicating a command for driving assistance for the vehicle under control of at least one of the plurality of second devices, the driving assistance being based on at least one of a route, a condition, and a status of the vehicle; and
a sensing device of the vehicle,
the plurality of second devices include a controller that performs control for driving assistance on the vehicle in accordance with the command received from one of the plurality of first devices via the second communicator, and
the anomaly determination rule includes a rule based on which the anomaly determiner determines that:
a combination of (i-1) the source information indicating the sensing device and (i-2) the data identifier included in the second unit data received by the controller has an anomaly; and
a combination of (i-1) the source information indicating the third device and (i-2) the data identifier included in the second unit data received by the controller is normal.

2. The in-vehicle network anomaly detection system according to claim 1, wherein
the second unit data included in the first unit data further includes a parameter for the control for driving assistance, and
the anomaly determination rule further indicates, for each of the plurality of second devices, a combination of (i-21) the data identifier included in the second unit data received according to specification and (i-22) a value of the parameter.

3. The in-vehicle network anomaly detection system according to claim 2, wherein
the command relates to one of acceleration, braking, and steering of the vehicle, and
the parameter relates to one of acceleration, braking, and steering of the vehicle.

4. The in-vehicle network anomaly detection system according to claim 1, wherein
as the predetermined anomaly processing, the anomaly determiner discards the first unit data determined as having an anomaly.

5. The in-vehicle network anomaly detection system according to claim 1, wherein
as the predetermined anomaly processing, the anomaly determiner identifies, based on the source information, the source of the first unit data determined as having an anomaly from among the plurality of first devices, and lowers a level of driving assistance on the vehicle.

6. The in-vehicle network anomaly detection system according to claim 1, wherein
as the predetermined anomaly processing, the anomaly determiner identifies, based on the source information, the source of the first unit data determined as having an anomaly from among the plurality of first devices, and blocks communications from the identified first device on the in-vehicle network.

7. The in-vehicle network anomaly detection system according to claim 1, wherein
the anomaly determiner outputs a result of the determination as the predetermined anomaly processing, and
the system further comprises a result transmitter that notifies a user of the vehicle of the anomaly by transmitting the result to an information provider in the vehicle to provide the user with information.

8. The in-vehicle network anomaly detection system according to claim 1, wherein
the anomaly determiner outputs a result of the determination as the predetermined anomaly processing, and
the system further comprises a result transmitter that transmits the result to a communication network outside the vehicle.

9. An in-vehicle network anomaly detection method performed in an in-vehicle network anomaly detection system that determines whether or not data communicated through an in-vehicle network in a vehicle has an anomaly, the system being on the in-vehicle network including a first network connecting a plurality of first devices that perform communications using a first protocol and a second network connecting a plurality of second devices that perform communications using a second protocol different from the first protocol,
the method comprising:
receiving first unit data from the plurality of first devices through the first network, the first unit data being data that is transferred in units specified in the first protocol;
determining whether or not the first unit data has an anomaly based on an anomaly determination rule;
extracting second unit data from the first unit data when the determination is made that the first unit data does not have any anomaly, the second unit data being data that is transferred in units specified in the second protocol and being included in a data field of the first unit data; and
transmitting the extracted second unit data to the second network,
wherein the first unit data includes source information indicating a corresponding first device serving as a source of the first unit data from among the plurality of first devices,
the second unit data included in the first unit data includes a data identifier of the second unit data,
the determining whether or not the first unit data has an anomaly includes comparing (i) a combination of (i-1) the source information and (i-2) the data identifier with (ii) the anomaly determination rule,
the plurality of first devices include:
a third device that transmits the second unit data included in the first unit data, the second unit data indicating a command for driving assistance for the vehicle under control of at least one of the plurality of second devices, the driving assistance being based on at least one of a route, a condition, and a status of the vehicle; and
a sensing device of the vehicle,
the plurality of second devices include a controller that performs control for driving assistance on the vehicle in accordance with the command, the command being received from one of the plurality of first devices, the command being included in the first unit data, the command being indicated in the second unit data that is extracted from the second unit data and transmitted to the second network data, and
the anomaly determination rule includes a rule based on which the determining is made that:
a combination of (i-1) the source information indicating the sensing device and (i-2) the data identifier included in the second unit data received by the controller has an anomaly; and a combination of (i-1) the source information indicating the third device and (i-2) the data identifier included in the second unit data received by the controller is normal.

* * * * *